United States Patent [19]

Bird

[11] Patent Number: 4,774,837
[45] Date of Patent: Oct. 4, 1988

[54] TRANSDUCER ASSEMBLY FOR A SPEED MEASUREMENT DEVICE

[75] Inventor: Jeremy Bird, Lymington, Great Britain

[73] Assignee: Brookes & Gatehouse Ltd., Hampshire, United Kingdom

[21] Appl. No.: 3,569

[22] Filed: Jan. 15, 1987

[30] Foreign Application Priority Data

Jan. 15, 1986 [GB] United Kingdom ................. 8600917

[51] Int. Cl.$^4$ ............................................. G01C 21/10
[52] U.S. Cl. ..................................................... 73/181
[58] Field of Search ............... 73/181, 861.18, 861.27, 73/861.26, 861.28, 861.29, 861.31, 861.23

[56] References Cited

U.S. PATENT DOCUMENTS

| 3,729,993 | 5/1973 | Eck et al. | 73/181 |
| 3,751,979 | 8/1973 | Ims | 73/194 A |
| 3,978,726 | 9/1976 | Shih | 73/189 |
| 4,685,093 | 8/1987 | Gill | 73/181 |

FOREIGN PATENT DOCUMENTS

| 649573 | 1/1951 | United Kingdom . |
| 953631 | 3/1964 | United Kingdom . |
| 1549182 | 7/1979 | United Kingdom . |

Primary Examiner—Donald O. Woodiel
Attorney, Agent, or Firm—Remy J. VanOphem

[57] ABSTRACT

A transducer assembly for a speed measurement device for measuring the speed of a marine vehicle through the water is disclosed. The device comprises a transmitter circuit and a receiver circuit connected to two transducers which are positioned substantially in the direction of travel of a marine vehicle below the water line thereof. Pulse trains are transmitted in both directions between the transducers which are received by the receiver circuitry so that a signal is derived indicative of the time taken for the signals to travel both for and against the direction of travel of the ship, this signal being proportional to ship's speed. The assembly including the transducers includes outwardly projecting ribs for directing the aerated water away from the acoustic path between the transducers when the marine vehicle is moving through water.

18 Claims, 6 Drawing Sheets

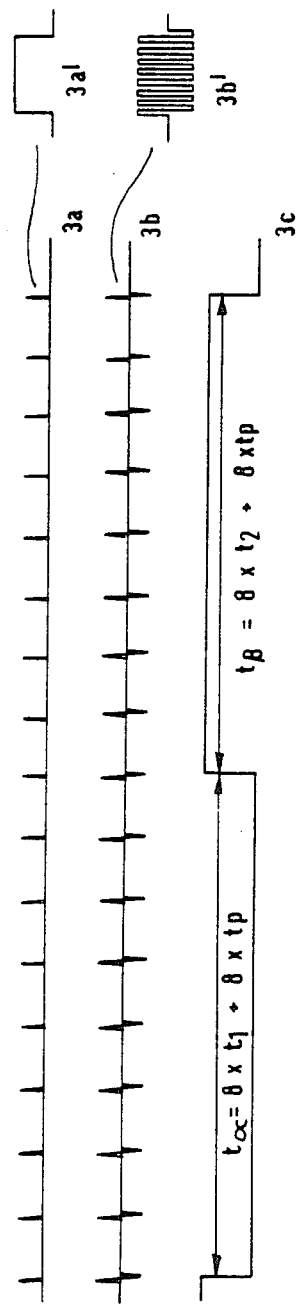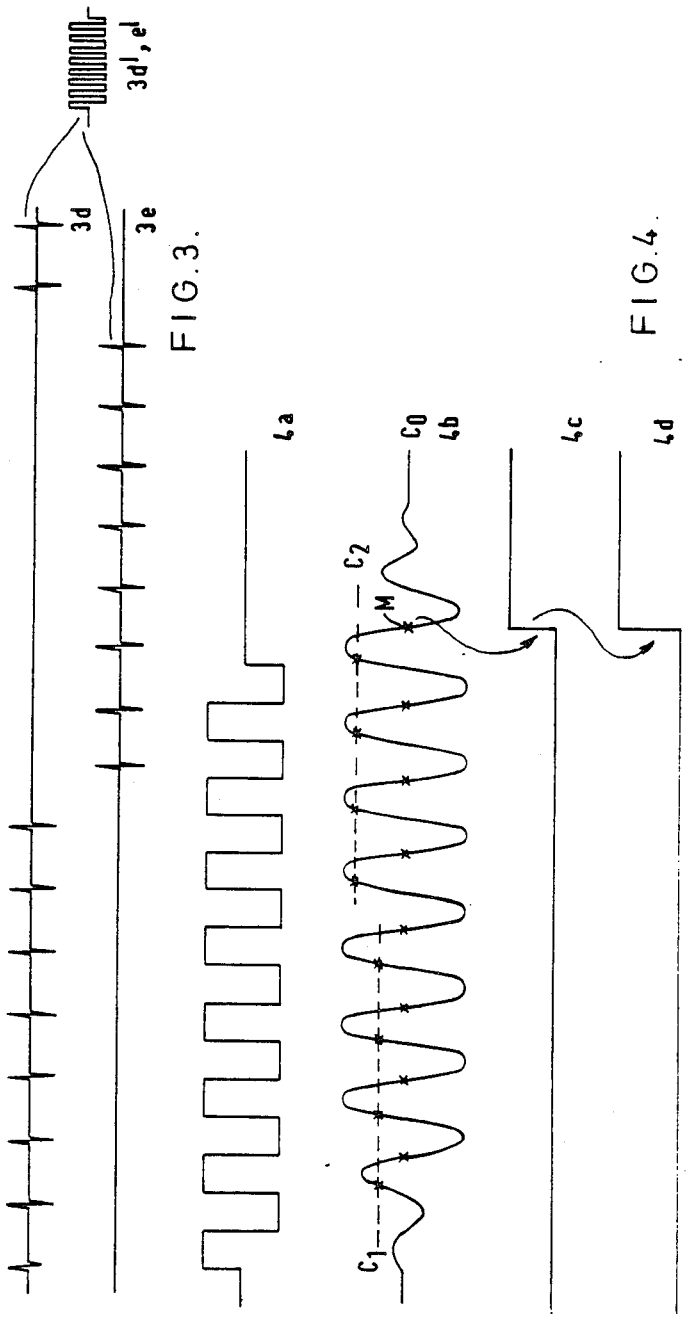
FIG.3.
FIG.4.

TRANSDUCER ASSEMBLY FOR A SPEED MEASUREMENT DEVICE

BACKGROUND OF THE INVENTION

1. Field of the Invention

This invention relates to a transducer assembly for a speed measurement device, particularly, but not exclusively, for measuring the speed of a ship through the water.

2. Description of the Prior Art

A ship speed indicator has been proposed in U.S. Pat. No. 3,898,878 (Stallworth and Hartley) for measuring ship's speed by calculating the time taken for acoustic signals to travel between two projector-receiver modules, each containing a transmitter and a receiver, positioned at preselected points relative to the ship's hull. A logic and display module located in the interior of the ship is connected between the projector-receiver modules. Measurements are made of the time taken by acoustic signals to travel from the projector of one of the modules to the receiver of the other and vice versa. From the distance between the selected points and the difference in time taken for the acoustic signals to travel in the opposed directions between the modules, the speed of the ship is derived.

It is a disadvantage of such a device that it is necessary to locate the projector-receiver modules at positions located away from the hull of the ship to avoid any turbulence due to motion of the ship. The transducers thus have a high profile relative to the hull and are prone to damage, as well as introducing extensive drag.

SUMMARY OF THE INVENTION

According to the invention there is provided a transducer assembly for use in a speed sensing device for a water craft, the assembly including first and second transducer mechanisms defining between them an acoustic path. The first and second transducer mechanisms are connected by a support for attachment to a submerged portion of the water craft. The support includes a deflector device to modify water flow in the region of the acoustic path so as to reduce acoustic interference in the acoustic path.

BRIEF DESCRIPTION OF THE DRAWINGS

An embodiment of the invention will now be described, by way of example, with reference to the accompanying drawings, in which:

FIGS. 3, 4 and 5 are timing diagrams showing signal characteristics at various points on the circuit of FIG. 2;

DETAILED DESCRIPTION OF THE PREFERRED EMBODIMENT

The mode of operation of the speed sensing device relies on a precise measurement of the transit times of high frequency acoustic pulses between two transmitters spaced substantially in the direction of travel of a boat or ship.

Figure 1:
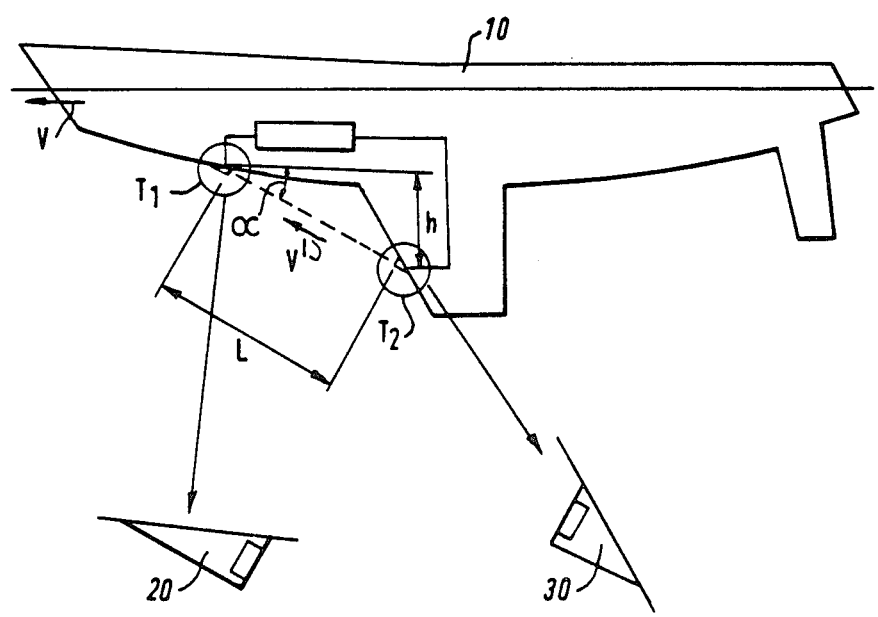
FIG. 1 is a schematic view of the hull of a ship to which a speed sensing device is applied.

With reference to FIG. 1, transducers $T_1$, $T_2$ which act both as transmitters and receivers are shown. They are mounted on the hull of a ship 10 in mountings 20, 30 which are shaped and positioned so that the transducers are spaced from one another across an acoustically quiet transmission path of length L, for example between the forefoot of the hull and the leading edge of the keel.

If the angle of inclination of the transmission path, with reference to the direction of movement of the boat is $\alpha$, the transmission times $t_1$, $t_2$ for pulses between the transducers $T_1$, $T_2$ are:

$$t_1 = L/(c + v'), \ldots \quad (1)$$

for pulses travelling in the same direction as that of the ship, and $$t_2 = L/(c - v'), \ldots \quad (2)$$

for pulses travelling in the opposed direction to that of the ship.

Where c = the speed of sound through the water;

$v' = v \cos \alpha$; $\alpha = \sin^{-1} h/L$; and v = ship speed

Hence $$t_1 - t_2 \approx 2Lv'/c^2 (c > v') \ldots \quad (3).$$

Hence $$v' \simeq \frac{(t_1 - t_2)c^2}{2L}. \quad (4)$$

Thus, provided the transit times $t_1$, $t_2$ can be measured accurately by timing the arrival of pulses transmitted from one transducer to the other (and vice versa), the speed of the ship, v, can be calculated.

A frequency of acoustic transmission between the transducers of 500 kiloHertz is preferred. This frequency has several advantages. In particular scattering and reverberation caused by small bubbles at the sea surface is negligible except in areas of heavy aeration. Use of this frequency also allows small transducers (piezo-electric crystals of 10 mm diameter by 3 mm thickness for example) to be used. Further this frequency is high enough to enable the time measurements to be made with acceptable precision for acoustic path lengths L between the transducers $T_1$, $T_2$ in a preferable range of 0.2–1.4 m, to allow use of the speed sensing device on small ships. This frequency also has limited propagation in sea water and is not used for sonar and echo sounding uses which thus reduces possible interference.

However, use of such a high frequency means that conventional techniques for detecting the precise arrival of the transmitted pulse train are not suitable. At a frequency of 500 kHz, assuming that the system is required to resolve speed to one hundredth of a knot (approximately 5 mms per second), and assuming the speed of sound in water is about 1500 meters per second, a time measurement precision of three parts per million is implied. This requires an acoustic path length of the order of a meter and a time resolution of the order of nanoseconds.

A transmitting and receiving circuit for measuring the transit times $t_1$, $t_2$ will now be described with reference to FIG. 2.

The circuit is generally divided into transmitter and receiver sections controlled through a master flip-flop 100.

The master flip-flop 100 enables the transmitting circuit when active. The output of the flip-flop 100 is connected, firstly, to a gated 1 MHz oscillator 110, which is in turn connected to a transmitter control circuit 130 via a divider circuit 120. The output from divider 120 is fed back through a divider circuit 140 which is connected to the ENABLE input of the flip-flop 100.

Figure 6:
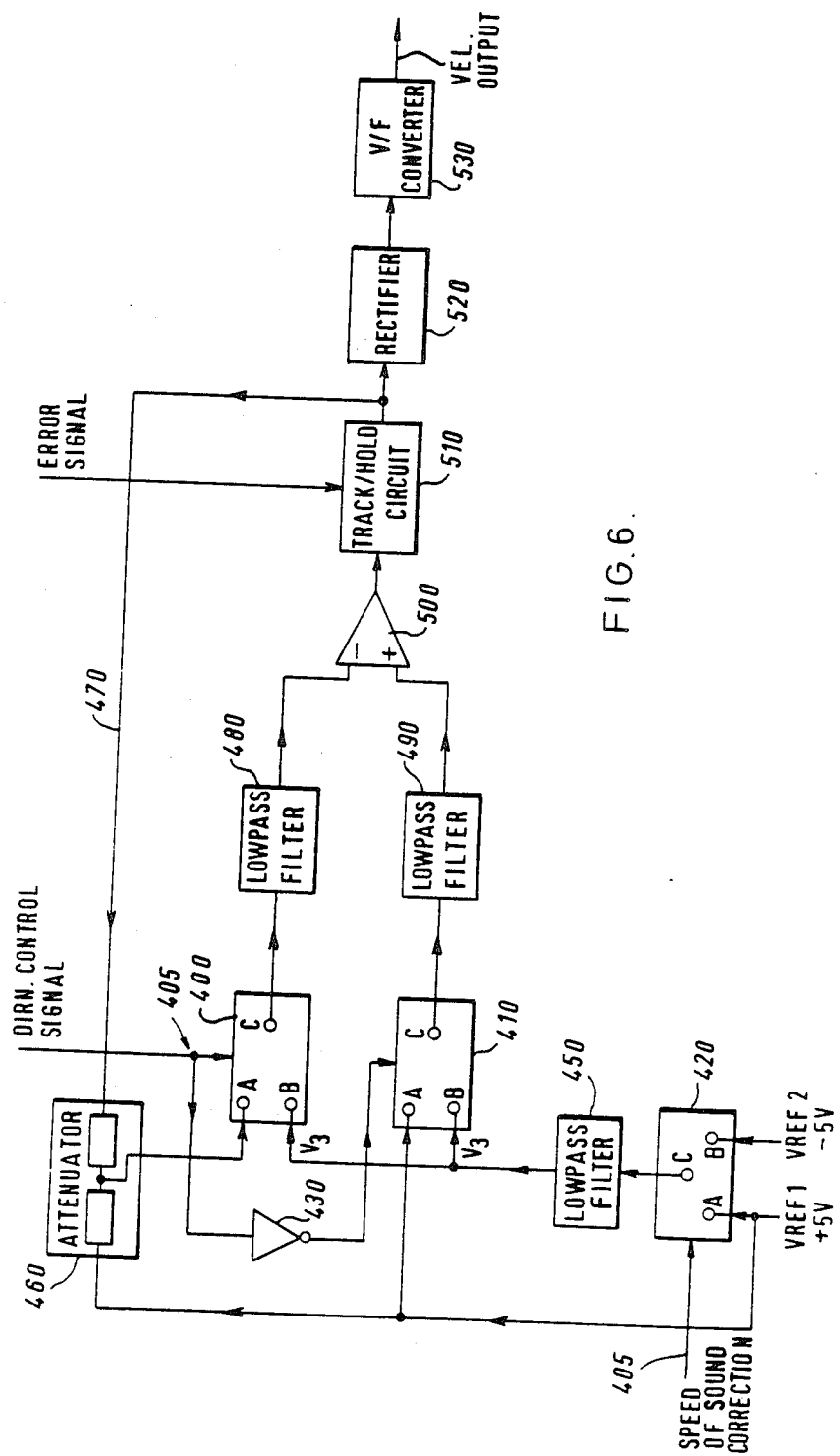
FIG. 6 shows an example of a signal processing circuit for use with the circuit of FIG. 2.

The output from the master flip-flop 100 also has a direct connection to the transmitter control circuit 130, to provide an enable signal and a further connection to a divider circuit 180, to provide a direction control to the circuit 130. The output from the divider circuit 180 also provides an output to a processing circuit (FIG. 6).

The transmitter control circuit 130 is connected to a pair of transmitters 190, 200 which are connected to respective transformers 80, 82 associated with the transducers $T_1$ and $T_2$. The transducers $T_1$, $T_2$ are arranged to act as both transmitters and receivers and are preferably piezo-electric devices. The transformers 80, 82 are arranged to receive signals in both directions so that when one transducer is transmitting, signals can be received by the other transducer and passed through its respective transformer to one of the terminals of a switch 210, which is controlled through the direction control lead from the divider circuit 180. The switch 210 may be replaced with a straight connection, but this can cause interference in aerated water conditions.

The receiver circuitry is made common for both transducers $T_1$, $T_2$, so that the processing delays in the receiver circuits do not fluctuate in dependence upon the direction of signal transmission. The receiver circuitry includes an amplifier 220, a filter 230, a variable threshold comparator 240, and a divider 260. The gain of the amplifier 220 is adjustable through an AGC network including a gated detector 280, and an integrator 290.

The output signal from the comparator 240 is also fed to a monostable 270 which controls the reset of the divider circuit 260.

The divider circuit 260 has two outputs: a divide by 8 output which is connected both to a feedback network 250 and, through an AND gate 255, to the enable input of the gated detector 280; and a divide by 16 output which forms the input to the master flip-flop 100.

An error detection circuit 300 is provided, for detecting and compensating for errors occurring in the transmitter and receiver circuits as will be described in more detail below. The error detection circuit 300 is connected to a 0.5 second monostable 310 which in turn outputs an error signal to the processing circuitry of FIG. 6.

Timing is controlled through the master timing circuit 150 which is clocked through a master oscillator 160, which has a frequency adjustment 170.

The master timing circuit 150 provides timing information to the flip-flop 100, monostable 270, AND gate 255 and error detection circuit 300. The timing circuit also provides a "speed of sound correction" output to the processing circuitry.

Operation of the transmission portion of the circuit will now be described with reference to FIG. 3, which shows a series of transmission cycles.

At the start of every transmission cycle, the master flip-flop 100 is enabled and the output thereof becomes high. This turns on the oscillator 110, which produces a square wave pulse train at 1 MHz which is applied to the divider circuit 120 which divides the pulse train by 2 to produce a 500 kiloHertz output to the transmitter control circuit 130. The 500 kHz output from the divider circuit 120 is also fed into the divider circuit 140 which performs a divide by 8 (or optionally 12) operation. The output from the divider 140 acts to disable the master flip-flop 100 when 8 (or 12) pulses have been output from divider 120. The flip-flop output is therefore a pulse as indicated by numeral $3a'$ and the output from the divider 120, each time the master flip-flop 100 is enabled, is a pulse train of 8 (or 12) square wave pulses as indicated by numeral $3b'$.

The divider circuit 180 counts pulses output from the master flip-flop 100, as indicated by numeral $3a$, and changes state every 8 pulses as indicated by numeral $3c$. This signal is used to change the direction of transmission by the transmitter circuit. It is disadvantageous to change the direction of transmission after every pulse cycle, or after every two or three pulse cycles as the system tends to become destabilized and the signal transmitted by one transducer can be confused with the back scattered signal transmitted by the other transducer previously. If the direction is alternated too slowly this can result in appreciable changes in the effective propagation velocity c between changes in direction of transmission.

The transmitter control circuit 130 is thus provided with a direction control input, an enable input and a pulse train input. The transmitter control circuit 130 interprets these inputs to drive either transmitter 190 or transmitter 200, which in turn outputs a signal to its respective transformer 80, 82 as indicated by numerals $3d$ and $3e$ respectively and thence to the transducers $T_1$, $T_2$.

Although two separate transmitters 190, 200 have been illustrated, these transmitters could easily be replaced by a single transmitter and a direction controlled logic gate, to switch the output from the transmitter between the transducers $T_1$, $T_2$ as appropriate.

The operation of the receiver portion of the circuit will now be described with reference to FIG. 4. The signal received by the receiving transducer from the transmitting transducer selected by the transmitter control circuit 130, is illustrated by numeral $4b$. Due to the characteristics of the transducers, the signal bears only slight relation to the signal output from the transmitter indicated by numeral $4a$. As the rise time of the signal $4b$ is slow, accurate detection of a pulse early in the pulse train is not feasible. The receiver circuitry therefore takes a timing marker M from a pulse in the developed part of the pulse train.

The pulse train is fed, through switch 210, to the automatic gain control amplifier 220 whose function is to adjust the amplitude of the signal to a level suitable for subsequent processing. The output from the amplifier 220 is fed to a filtering stage 230 which is preferably a 500 kHz, 50 kHz band width, filter and thence to the comparator 240. The comparator has a variable threshold level, the threshold being varied through the feedback network 250. As can be seen from signal $4b$, the comparator 240 has three threshold levels $c_0$, $c_1$ and $c_2$. The incoming signal is compared, firstly, to an intermediate positive level $c_1$ at a selected point above the base line of the signal. Each time a successful comparison is made, the divider circuit 260 increments by one, having been triggered through monostable 270 by the first pulse comparison. After the first comparison, the threshold level is changed by the feedback network to the zero crossing threshold $c_0$. When this has been detected, the comparator is switched back to threshold $c_1$ and so on until the eighth comparison has been made (the zero crossing on the fourth detected pulse) at which time the divider circuit 260 provides an output to the network 250 to change the positive comparison level to $c_2$. This change in level is made so that the circuit can reject intermediate level noise which may have been interpreted as an input signal previously. The comparisons then continue as before with the feedback network 250 adjusting the comparator threshold as previously described until the eighth zero crossing M (16th comparison). Due to the high gradient of the signal at this point in the pulse train, the time at which this transition occurs can be determined with great accuracy. At this point the divider 260 then sends a pulse to the master flip-flop 100, to indicate arrival of the transmitted pulse train, as indicated by numeral 4c. The flip-flop 100 then outputs a further pulse 4d.

When the divider circuit 260 outputs a pulse to the master flip-flop 100, the flip-flop 100 outputs another pulse to the oscillator 110, transmitter control circuit 130 and divider circuit 180. Thus, as shown more clearly in FIG. 3, a series of pulses are output from the master flip-flop. The arrival of the previous pulse at the input to the master flip-flop 100, via the receiver circuit, prompts the output of the next pulse to form a pulse train as indicated by numeral 3a. The divider circuit 180 counts these pulses and changes states every eighth pulse to produce a direction control signal 3c. The transmitter control circuit 130 then controls the transmitters 190, 200 to alternately transmit a series of eight pulse trains, as indicated by numerals 3d and 3e, each pulse train consisting of eight pulses at 500 kiloHertz which have been input from the oscillator 110 and divider circuit 120.

The time taken for the direction control signal to change state ($t_\alpha$ or $t_\beta$) is equal to 8 transit times between the transducers $T_1$, $T_2$ (or vice versa) +8 signal processing delays. As the receiver circuit is common to both transducers, the processing time will be substantially constant. Thus the difference in time taken for the direction control signal to change state ($t_\alpha$, $t_\beta$) will be proportional to the velocity of the ship by analogy with equation (4).

Figure 5:
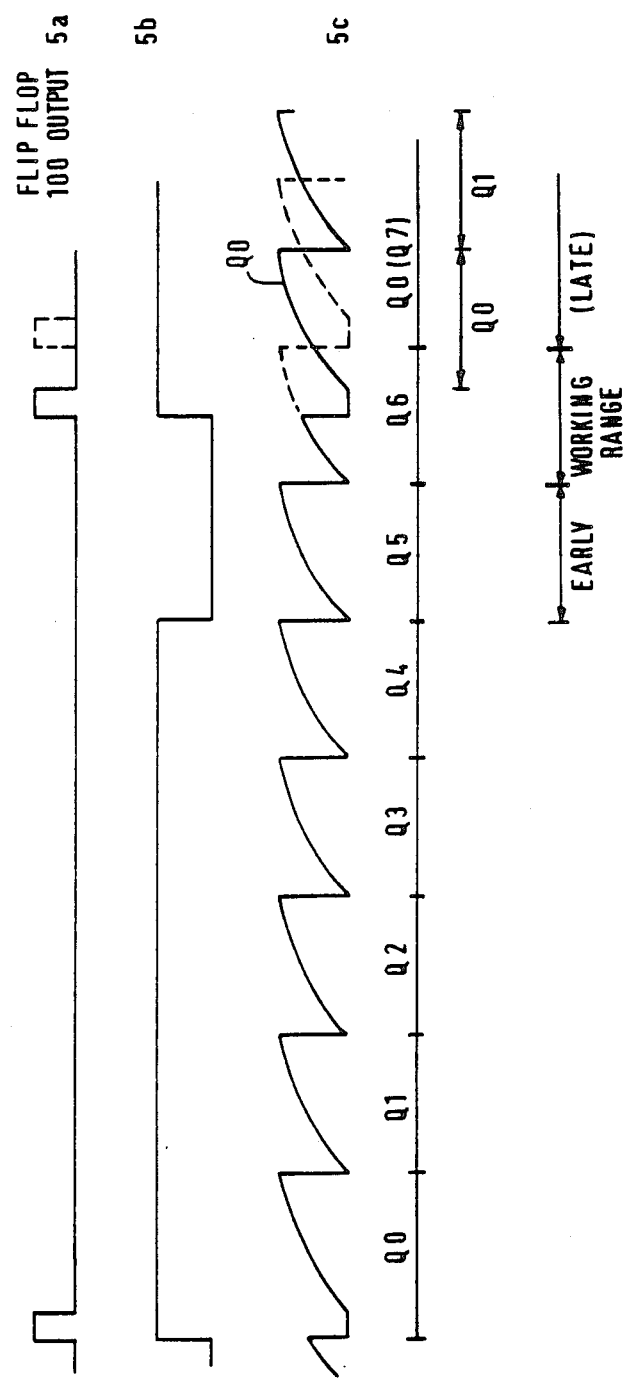

The error correction and detection circuitry will now be described with reference to FIGS. 2 and 5.

The timing for the error control circuitry is made through the master timing circuit 150. This circuit is connected to the master oscillator 160. The frequency of the master oscillator is adjusted in dependence upon the distance L between transducers $T_1$, $T_2$, so that when the ship is stationary, the time of reception, through the receiver circuitry of a pulse transmitted by the master flip-flop 100 (which will trigger the sending of another pulse from the flip-flop as indicated by numeral 5a) occurs during the cycle $Q_6$ of the oscillator as indicated by numeral 5c. The cycle $Q_6$ defines the working range of the receiver circuitry and variations on pulse train arrival time caused by ship speed variations will not generally be sufficient to place the arrival time outside cycle $Q_6$.

The master timing circuit 150 uses the timing information provided by the oscillator for controlling the various error detection and correction circuitry.

In order to ensure accurate timing, the master flip-flop resynchronizes the oscillator every time it outputs a pulse.

In order to suppress any noise occurring before time interval $Q_5$, the divider circuit 260 which receives the comparator output, is held in a reset mode by a 2.7 $\mu$s monostable 270. The monostable 270 is only enabled by the master timing circuit 150 at cycle $Q_5$ of the oscillator 160 as indicated by numeral 5b. The monostable 270 is then triggered by the incoming signal from the comparator 240, through line 241, to set the divider 260.

The monostable is arranged to keep the divider 260 enabled for two cycle periods $Q_5$ and $Q_6$. However, signals received are only used for processing if they occur within the working range cycle $Q_6$. Pulses arriving in cycle time $Q_5$ are taken to be too early and are therefore judged to be an error. Triggering in the period $Q_5$ will most often be caused by the amplitude of the signal being too high so that noise is amplified and interpreted as the received signal. Similarly, if the pulse is not received by the end of cycle $Q_6$, this also indicates an error which is probably caused by the amplitude of the received signal being too low. The error detection circuit 300 is used to compensate for this and receives inputs from the master timing circuit at cycle $Q_5$ and cycle $Q_7$. An output from the master flip-flop 100 is also input. If the pulse from the master flip-flop is found to occur at the cycle $Q_5$ or cycle $Q_7$ intervals, an output from the error detection circuit is fed to enable the integrator 290 which acts, in combination with the detector 280 and amplifier 220, to adjust the amplitude of the received pulse train. The detector 280 is only enabled at the potential valid time of arrival of a pulse through the receiver circuit, the enable signal being sent through AND gate 255 which gates the pulse $Q_6$ from the master timing circuit 150 with the divide by eight output from the divider 260. The gated detector then detects the amplitude of the incoming signal, which is then used to adjust the gain of the amplifier 220 through integrator 290. The gain of the amplifier is thus adjusted for the next received pulse train, using the previous pulse train as a reference.

When an error is detected, the detection circuit triggers a 0.5 second monostable which ensures that the error signal remains high until the system settles down following the error.

When the signal is not received by the start of the cycle $Q_7$, the master timing circuit outputs a pulse to the master flip-flop 100 to trigger pulse output (the same pulse is also sent to the error detection circuit 300 which effects a gain correction as described above). The processing circuitry will now be described with reference to FIG. 6 which illustrates an analog averaging technique for obtaining a velocity signal proportional to frequency. The circuit includes two switches 400, 410 which each have two signal inputs A, B and a single output C. Switch 400 is controlled by the direction control signal which is also fed, through NOT element 430, to the control input of switch 410 so that the switches 400, 410 are controlled in anti-phase.

The inputs B of switches 400, 410 are connected via a low pass filter 450 to a switch 420, which has two level inputs $v_{ref\,1}$ and $v_{ref\,2}$ and a control input. The control input is obtained from the master timing circuit and is a speed of sound correction signal, the use of which is explained below. The level $v_{ref\,1}$ is fed to input A of switch 410 and also, through an attenuator 460, to input A of switch 400. The attenuator 460 modulates the input $v_{ref\,1}$ with the output voltage from the circuit via feedback loop 470.

The outputs from the switches 400, 410 are each fed to low pass filters 480, 490 and thence to an operational amplifier 500. The output from the operational amplifier is connected to a track and hold circuit 510 to which the error signal from the monostable 310 is input.

The output from the circuit 510 is fed to a rectifier 520 which is connected to a voltage to frequency converter 530 which gives a frequency output proportional to speed.

In use, the combination of each switch 400, 410 and 420 and respective low pass filter 480, 490, 450 forms an averaging circuit which averages the inputs A, B to the switches in dependence upon the length of time to which they are connected to their respective outputs C under control of the respective control inputs.

The switches are controlled so that switch 400 will be in position A when the control input is high, while switch 410 will be in position B, and vice versa. Averaged outputs from the respective switches will therefore be dependent upon the difference in time duration of the direction control signal portions $t_\alpha$, $t_\beta$ indicated by numeral 3c in FIG. 3.

The averaged outputs are applied to the operational amplifier (op amp) 500 to produce a signal which, when applied to input A of switch 400 via attenuator 460, modulates the value of $v_{ref\,1}$ so as to cause the operational amplifier inputs to be equal. This feed back signal is then proportional to ship's speed.

More specifically,

At switch 410:

$$\text{Average output} = \frac{t_\alpha \cdot v_{ref\,1} + t_\beta \cdot v_3}{t_\alpha + t_\beta}$$

At switch 400:

$$\text{Average output} = \frac{t_\alpha \cdot v_3 + t_\beta (V_{ref\,1} - kx)}{t_\alpha + t_\beta}$$

where
x = output signal from the op amp, and
k = attenuation of attenuator 460.

The Op Amp 500 adjusts x to make the inputs thereto equal so that:

$$\frac{(t_\alpha \cdot v_{ref\,1} + t_\beta \cdot v_3) - (t_\alpha \cdot v_3 + t_\beta)}{t_\alpha + t_\beta} = 0, \quad (5)$$

$$\text{so}(v_{ref\,1} - v_3) \cdot \frac{(t_\beta - t_\alpha)}{(t_\alpha + t_\beta)} = \frac{t_\beta}{t_\alpha + t_\beta} kx$$

As $t_\alpha \simeq t_\beta$, $\frac{t_\beta}{t_\alpha + t_\beta} = 0.5$ so $kx = 2(v_{ref\,1} - v_3) \frac{(t_\beta - t_\alpha)}{(t_\beta + t_\alpha)}$ Using equations 1 and 2:

$$t_\alpha = \frac{8L}{c + v'} + 8tp, \text{ and}$$

-continued
$$t_\beta = \frac{8L}{c - v'} + 8tp,$$

where tp = processing delay.
So:

$$\frac{t_\beta - t_\alpha}{t_\beta - t_\alpha} \approx \frac{\frac{Lv'}{c^2}}{tp + \frac{L}{c}} \quad (c >> v') \quad (6)$$

Substituting (6) in (5):

$$x = \frac{2}{k}(v_{ref\,1} - v_3)\frac{Lv'}{c^2 tp + Lc} \quad (7)$$

The output signal x is thus proportional to speed v'. However, x also varies with c, so a speed of sound correction signal is introduced. The signal is a square wave which causes switch 420 to spend time $t_3$ (fixed and arbitrary ($t_3 < t_\alpha + t_\beta$)) switched to $v_{ref\,2}$ and time ($t_\alpha + t_\beta - t_3$) switched to $v_{ref\,1}$.

Therefore, the averaged output of switch 420 ($v_3$) is in fact:

$$v_3 = \frac{v_{ref\,2} \cdot t_3 + v_{ref\,1}(t_\alpha + t_\beta - t_3)}{t_\alpha + t_\beta} \quad (8)$$

$$= \frac{t_3}{t_\alpha + t_\beta}(v_{ref\,2} - v_{ref\,1}) + v_{ref\,1}.$$

Now, $t_\alpha + t_\beta = 16\left(tp + \frac{L}{c}\right),$ so, $v_3 = \frac{t_3}{16\left(tp + \frac{L}{c}\right)} \cdot (v_{ref\,2} - v_{ref\,1}) + v_{ref\,1}.$ Thus, combining equations (7) and (8):

$$x = \frac{2}{k}(v_{ref\,1} - v_{ref\,2})\frac{\frac{Lv'}{c^2}}{\left(tp + \frac{L}{c}\right)} \cdot \frac{t_3}{16\left(tp + \frac{L}{c}\right)} \quad (9)$$

$$= \frac{1}{8k}(v_{ref\,1} - v_{ref\,2}) t_3 v' \cdot \frac{L/c^2}{tp^2 + 2tp\frac{L}{c} + \left(\frac{L}{c}\right)^2}$$

Now
$tp \sim 2 \times 10^{-5} S$ $L \sim 1 \text{ m}$ $c \sim 1500 \text{ ms}^{-1},$ hence $\left(\frac{L}{c}\right)^2 >> 2tp \cdot \frac{L}{c} + tp^2$ so $x = (v_{ref\,1} - v_{ref\,2})\frac{t_3 v'}{8kL}$ which is independent of c.

Figure 2:
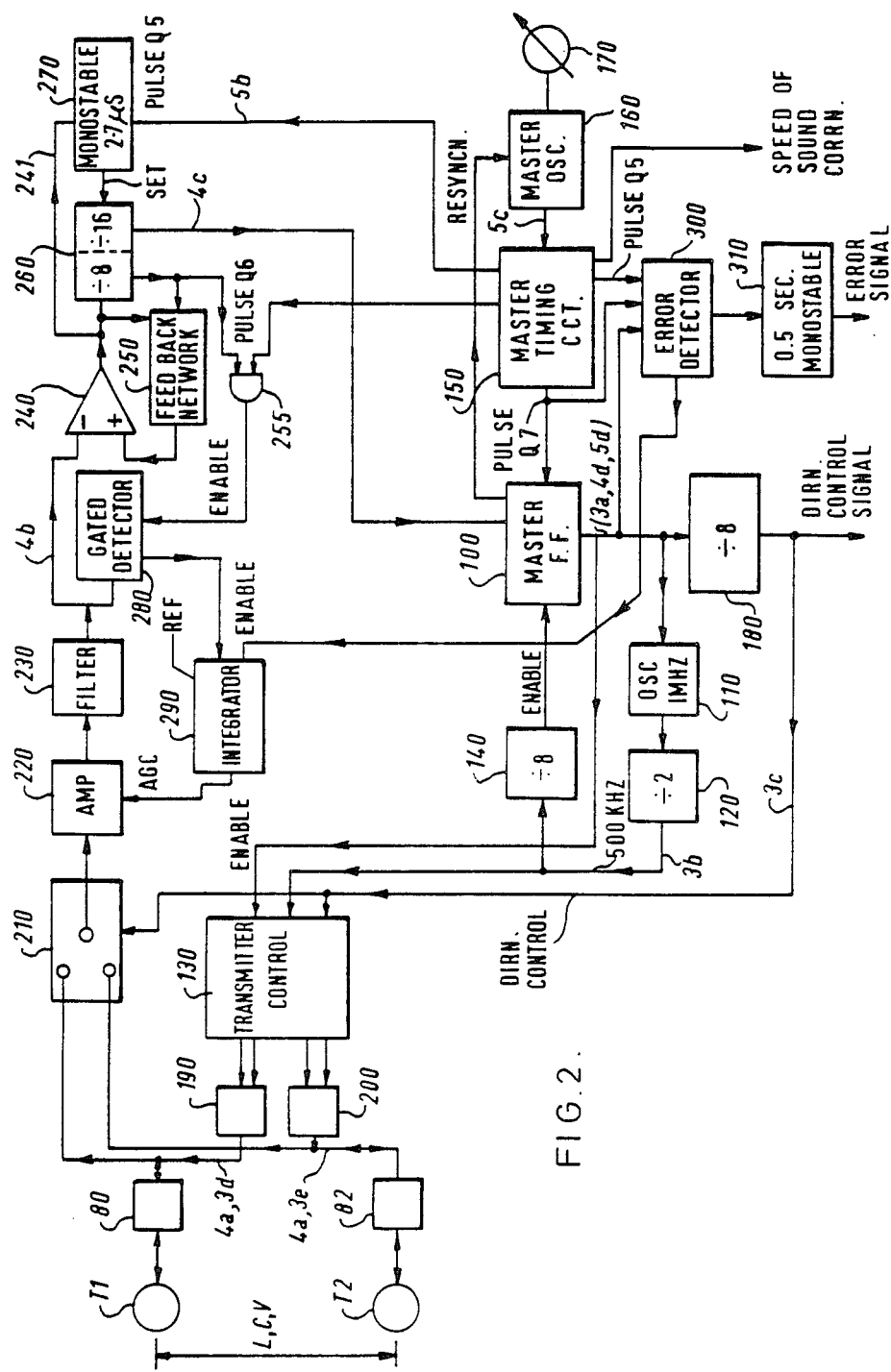
FIG. 2 is a block diagram showing the transmitter and receiver circuitry of the speed sensing device of FIG. 1.

As shown in FIGS. 2 and 6, $t_3$ is derived from the master timing circuit, and is chosen so as to be proportional to L (the frequency of the master oscillator adjusted in dependence upon L) thus making the overall scaling factor independent of L also.

In the event of an error beng detected, the previous voltage indicating speed is held in the track and hold circuit 510 by application of the error signal. The 0.5 second monostable 310 ensures that the error signal remains present for a sufficient time to allow the system to settle down after the error.

The rectifier is included so that when the ship 10 is moved in the opposite direction to its normal direction of travel the speed indications do not appear as negative.

The voltage to frequency converter 530 converts the speed indicative voltage to a speed indicative frequency, this frequency signal being fed to a display device.

The processing circuitry also preferably includes a delay circuit at junction 405, for delaying the input to switch 410 by two out of the eight pulse cycles, the timing for this coming from the master flip-flop 100. This results in the first two pulse cycles of each velocity signal $t_\alpha$, $t_\beta$ being ignored, introducing a further scaling factor into the output. However, this allows any mistriggering caused by confusion between the signal transmitted by one transducer with the back scattered signal transmitted by the other transducer previously to be suppressed.

It is to be understood that the processing circuit and technique illustrated are not to be construed as limitative and a standard digital processing technique would be equally applicable using, for example, a 500 MHz clock with a 20 bit ECL logic up/down counter, although such a technique has the disadvantages of having a higher power consumption, higher noise generation and being generally more expensive than the analog system described.

While the embodiment of the invention described has been applied to a ship, this is not to be construed as limitative. For example, the device is applicable to the measurement of speed of any object to which it is applied provided the object moves through a medium which allows acoustic transmissions therethrough.

Also, while a frequency, f, of acoustic transmission of 500 kHz has been used, other frequencies in the range 200 KHz $< f <$ 1.5 MHz are usable.

Furthermore magneto-strictive transducers are equally feasible for use as the transducers $T_1$, $T_2$.

As mentioned with reference to FIG. 1, it is desirable to position the transducers $T_1$, $T_2$, across an acoustically quiet transmission path L. As illustrated in FIG. 1, the transducers $T_1$, $T_2$ are positioned on the forefoot of the hull and the leading edge of the keel. However, with flat-bottom vessels, for example high speed power boats which do not have a keel, attachment of the transducers direct to the hull is not feasible as entrainment and flow of air bubbles along the hull due to the reduction in pressure caused by movement of the vessel results in an unacceptable level of acoustic interference.

Figure 7:
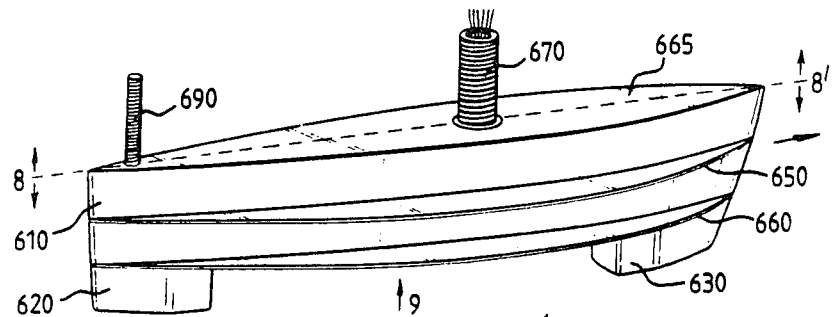
FIG. 7 is a perspective view of an embodiment of a transducer assembly of the invention.
Figure 8:
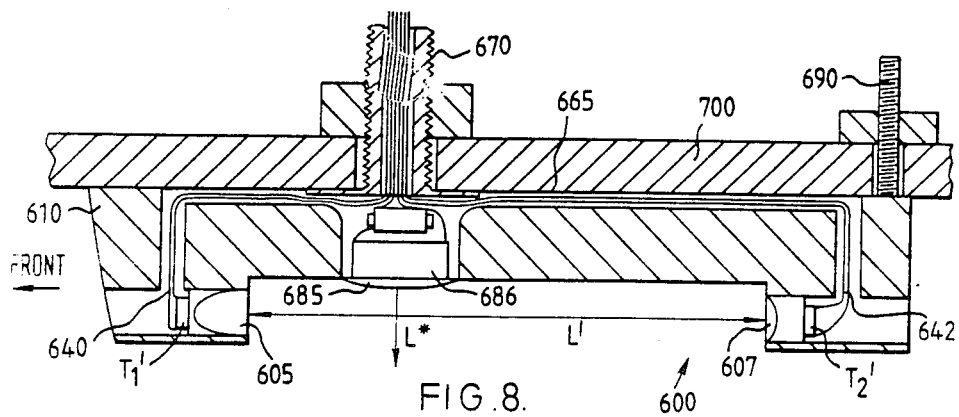
FIG. 8 is a sectional view taken through the plane 8—8' of FIG. 7.
Figure 9:
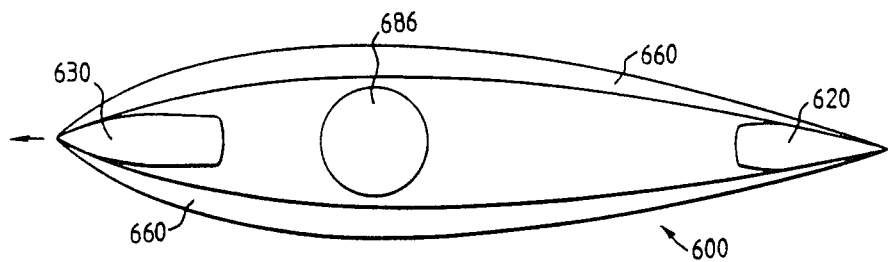
FIG. 9 is a plan view taken in the direction of arrow 9 of FIG. 7.

With reference to FIGS. 7 to 9, an embodiment of a transducer assembly to alleviate this problem is illustrated. The transducer assembly, generally designated 600, includes a support 610 to which first and second mounting members 620, 630 are attached. The support 610 and mounting members 620, 630 are of streamlined form to reduce drag and wake disturbance and are formed from bronze or plastic material.

Each transducer mounting member carries a respective transducer $T_1'$, $T_2'$ of similar form to that disclosed with reference to FIG. 1, the transducers facing one another across an acoustic path L' via respective neoprene interfaces 605, 607 and each transducer being provided with electrical connections 640, 642 to the transmitting and receiving circuitry.

Two layers of deflector plates 650, 660, project from the support 610; the plates being spaced from and parallel both to the acoustic path L' and to a hull engaging surface 665.

The support is connected to a hull 700 by bolts 670, 690, for example, so that the acoustic path L' is substantially parallel to the direction of travel of the vessel, with the transducers $T_1'$, $T_2'$ being connected to the transmitting and receiving circuitry within the vessel.

In use, the plates 650, 660 act to direct the flow of water and air bubbles in parallel relation therewith and deflect the passage of aerated water flowing from the region of the hull 700 towards the acoustic path L' thus protecting the acoustic path L' from aeration interference.

As the transducers $T_1'$, $T_2'$ are fixed to the support 610, post-manufacture calibration of the speed measurement device is unnecessary, the dimension L' being fixed during manufacture in contrast to the embodiment illustrated in FIG. 1 in which the dimension L depends upon the position chosen for the transducers $T_1$, $T_2$ (see equation 4 in this respect).

The bolts 670, 690 are preferably sufficiently weakly attached to the support 610 so that if the transducer assembly 600 hits an object in the water it will shear off, rather than damage the hull 700.

Preferably, an echo-sounding transducer 686 for sensing depth is also provided, disposed within the support 610 behind a neoprene interface 685 and facing downwardly between transducers $T_1'$, $T_2'$. The acoustic path L* for the transducer 686 is thus also protected from aeration interference by the plates 650, 660. The consequent reduction in interference reduces the power requirement of the echo-sounding transducer 686, for sensing a given depth.

I claim:

1. A transducer assembly for use in a speed sensing device for sensing water-speed of a water craft, said water craft having a submerged portion, said transducer assembly comprising:
   support means attachable to said submerged portion of said water craft, said support means having a body portion integral therewith;
   first and second transducer means connected with said body portion of said support means, said first and second transducer means being in mutual spaced apart relation to define an acoustic path; and
   deflector means connected with said body portion of said support means for modifying water flow proximate said acoustic path so that acoustic interference is reduced between said first and second transducer means, said deflector means comprising first rib means projecting from said body portion of said support means, said first rib means being spaced from said acoustic path.

2. A transducer assembly as claimed in claim 1 wherein said first rib means is disposed in parallel relation with respect to said acoustic path.

3. A transducer assembly as claimed in claim 1 wherein said support means includes a surface structured to abut said submerged portion of said water craft; and said deflector means is disposed in parallel relation with said surface of said support means.

4. A transducer assembly as claimed in claim 1 further comprising second rib means projecting from said body portion, said second rib means being spaced from said acoustic path and said first rib means.

5. A transducer assembly as claimed in claim 4 wherein said second rib means is disposed in parallel relation with respect to said acoustic path.

6. A transducer assembly as claimed in claim 4 wherein said body portion of said support means is of streamlined cross-section.

7. A transducer assembly as claimed in claim 6 wherein said second rib means in combination with said body portion, forms a second projection from said body portion, said second projection being of enlarged streamlined cross-section.

8. A transducer assembly as claimed in claim 4 wherein said body portion has a leading edge defined by forward movement of said water craft, said leading edge of said body portion being tapered.

9. A transducer assembly as claimed in claim 1 wherein said body portion of said support means is of streamlined cross-section.

10. A transducer assembly as claimed in claim 9 wherein said first rib means in combination with said body portion forms a first projection from said body portion, said first projection being of enlarged streamlined cross-section.

11. A transducer assembly as claimed in claim 1 wherein said support means is formed of plastic material.

12. A transducer assembly as claimed in claim 1 wherein said support means is formed of bronze.

13. A transducer assembly as claimed in claim 1 further comprising an echo-sounding transducer connected to said body portion of said support means.

14. A transducer assembly as claimed in claim 13 wherein said echo-sounding transducer is disposed between said first and second transducer means.

15. A transducer assembly as claimed in claim 1 wherein said support means further comprises first and second modules attached to said body portion, said first and second modules having streamlined shape, said first module housing one of said first and second transducer means, said second module housing the other of said first and second transducer means, said first and second modules being disposed so that said first and second transducer means face one another across said acoustic path.

16. A device for measuring water-speed of a water craft, said water craft having a submerged portion, said device comprising:
support means attachable to said submerged portion of said water craft, said support means having a body portion integral therewith;
first and second transducer means connected with said body portion of said support means, said first and second transducer means being in mutual spaced apart relation to define an acoustic path;
deflector means connected with said body portion of said support means for modifying water flow proximate said acoustic path so that acoustic interference is reduced between said first and second transducer means, said deflector means comprising first rib means projecting from said body portion of said support means, said first rib means being spaced from said acoustic path;
transmitter means connected to said first and second transducer means for selecting one of said first and second transducer means, for energizing the selected transducer means for transmission of an acoustic signal along said acoustic path, and further for changing the selection of said one of said first and second transducer means so as to change direction of said transmission of said acoustic signal;
receiver means connected to said first and second transducer means for processing said acoustic signal as received at the other of said first and second transducer means and for determining arrival time of said acoustic signal;
control means for controlling said transmitter means and said receiver means; and
processing means connected to and responsive to said transmitter means and said receiver means for processing transit time of said acoustic signal in both directions between said first and second transducer means for deriving a signal indicative of said water-speed of said water craft.

17. A device for measuring water-speed of a water craft as claimed in claim 16 wherein said receiver means includes means for sensing a predetermined level of said received signal for determining said arrival time.

18. A device for measuring water-speed of a water craft as claimed in claim 16 including means for automatic gain adjustment of the received signal.

* * * * *

UNITED STATES PATENT AND TRADEMARK OFFICE
CERTIFICATE OF CORRECTION

PATENT NO. : 4,774,837

DATED : October 4, 1988

INVENTOR(S) : Jeremy Bird

It is certified that error appears in the above-identified patent and that said Letters Patent is hereby corrected as shown below:

Column 7, line 27, after "$t_B$" insert ---- as ----.

Column 7, line 53, delete "$(t_a \ v_3 + t_B)$" and insert ---- $(t_a \cdot v_3 + t_B (v_{ref} \ 1-kx))$ ----.

Signed and Sealed this

Fourteenth Day of March, 1989

Attest:

DONALD J. QUIGG

Attesting Officer

Commissioner of Patents and Trademarks